(12) United States Patent
Su-Man

(10) Patent No.: US 6,301,748 B1
(45) Date of Patent: Oct. 16, 2001

(54) CLIP TYPE FRICTION HINGE DEVICE

(76) Inventor: Gwag Su-Man, 70-2, Wonmi-dong, Wonmi-ku, Pucheon-si, Kyunggi-do (KR)

(*) Notice: Subject to any disclaimer, the term of this patent is extended or adjusted under 35 U.S.C. 154(b) by 0 days.

(21) Appl. No.: 09/574,931

(22) Filed: May 19, 2000

(30) Foreign Application Priority Data

Mar. 2, 2000 (KR) .................................................. 00-5894

(51) Int. Cl.[7] .................................................. E05C 17/64
(52) U.S. Cl. .................................. 16/342; 16/337; 16/340
(58) Field of Search ............................. 16/342, 337, 340

(56) References Cited

U.S. PATENT DOCUMENTS

| | | | |
|---|---|---|---|
| 5,697,125 | * 12/1997 | Gannon | 16/342 |
| 5,896,622 | * 4/1999 | Lu | 19/342 |
| 5,950,281 | * 9/1999 | Lu | 16/342 |
| 6,170,120 | * 1/2001 | Lu | 16/342 |

FOREIGN PATENT DOCUMENTS 11-148266 * 6/1999 (JP) .

* cited by examiner

Primary Examiner—Lynne H. Browne
Assistant Examiner—Aaron Dunwoody
(74) Attorney, Agent, or Firm—Pendorf & Cutliff

(57) ABSTRACT

The present invention relates to a clip type friction hinge device, which can be conveniently assembled and can freely adjust the torque to a desired rotary direction. The clip type friction hinge device of the present invention comprises a housing having an axial hole and a fixing slit formed at a lower portion of the axial hole; a rotary axis which is inserted to the housing to be rotatable; a torsion spring which elastically supports the rotary axis for the housing and is comprised of a pair of semi-cylindrical spring members; and a plurality of C type clips which are elastically inserted to the outer circumference of the torsion spring.

5 Claims, 5 Drawing Sheets

CLIP TYPE FRICTION HINGE DEVICE

BACKGROUND OF THE INVENTION

1. Field of the Invention

The present invention relates to a friction hinge device, and more particularly to an improved clip type friction hinge device which can be conveniently assembled and can easily adjust a torque.

2. Description of the Related Art

A friction hinge device is a very useful device for maintaining an object at a predetermined position or at a predetermined angle. For example, it is used to maintain a display of a notebook computer at a predetermined angle for a main body thereof or to properly adjust and maintain the screen angle of an LCD monitor. That is, in a notebook computer, the friction hinge device combines a cover in which a display is integrated to a main body so that the display can be opened/closed up and down. When the cover is opened, the friction hinge device serves to maintain the cover at a proper angle for the main body by the pressure of the spring and clip therein. In addition, the friction device generates a dynamic torque due to the friction when an object like a cover of a notebook computer is moved or rotated, thus restraining a rapid operation of the object and buffering the shock.

Representative modes presently used for such a friction hinge device are a wrap spring mode, an axial disk compression mode, a roll pin mode and a clip spring mode, and so on.

Such a friction hinge device is advantageous in its own way. However, most of the devices cannot be manufactured to a structure proper to a recent trend pursuing the miniaturization/thinness of products, or even though it can be manufactured in that way, it is complicated to manufacture it and the durability thereof rapidly drops in the case that high torque should be maintained. Therefore, to solve these problems, a friction hinge device of torsion spring mode has been recently developed.

The friction hinge device of torsion spring mode is constructed to adjust both the friction area and the pressure of a spring and to generate a frictional force of a constant size.

FIG. 1 shows a conventional friction hinge device of a torsion spring mode as described above.

As shown in FIG. 1, the friction hinge device has a housing 10, a rotary axis 20 and a torsion spring 30.

The housing 10 has an axial hole 10a and a fixing slot 10b formed at the lower portion of the axial hole 10a.

The rotary axis 20 has a first axis part 20a which is inserted to the axial hole 10a of the housing 10, a second axis part 20b connected to the end of the first axis part 20a and a fixing part 20c connected to the second axis part 20b and extended to the opposite direction of the first axis part 20a. The first and second axis parts 20a and 20b and the fixing part 20c may be separately or unitedly formed according to the conditions in manufacturing and assembling. A hole for screw 20d is formed at the fixing part 20c. The rotary axis 20 is combined to the cover of a notebook computer by a screw (not shown) fastened through the hole 20d. In this case, the housing 10 is similarly combined to the main body of the notebook computer by the fastening of a screw.

The torsion spring 30 is comprised of a plurality of clip type plate springs and is fixed to the housing 10 by being pressed to the rotary axis 20 and inserted to the axial hole 10a of the housing 10 together with the rotary axis 20.

FIG. 2 is a front view showing the friction hinge device of FIG. 1. As shown in FIG. 2, the torsion spring 30 is inserted to the axial hole 10a of the housing 10. The torsion spring 30 is fixed to the housing 10 not to be rotatable by fitting a lower projection part 30a of an arrow shape formed at the lower part thereof into the fixing slot 10b of the housing 10. The rotary axis 20 is pushed to a central hole 30c of the torsion spring 30.

Meanwhile, two oil grooves 30b facing against each other are formed at the inner circumference of the central hole 30c of the torsion spring 30, and the lubricating oil is charged to the oil grooves. Therefore, it is possible to reduce the friction resistance generated between the outer circumference of the rotary axis 20 and the inner circumference of the central hole 30c of the torsion spring 30 during the rotation of the rotary axis 20.

In such a friction hinge device, if the rotary axis 20 is rotated (e.g., if the cover of a notebook computer is opened or the screen angle of an LCD monitor is adjusted), the rotary axis 20 receives the torque due to the function with the torsion spring 30, and thereby a rapid rotation is restrained to buffer the shock. Thereafter, when the rotation is stopped at a predetermined rotary angle, the rotary axis 20 is fixedly maintained at the angle by the pressure due to the tightening elasticity of the torsion spring 30. Since the torsion spring 30 is fixed to the housing 30 not to be rotatable, the generation of the torque due to the friction during the rotation of the rotary axis 20 is ensured. Since the torsion spring 30 of a closed circle shape stably supports the rotation of the rotary axis 20 and the friction resistance is reduced by the lubrication of oil, the rotation of the rotary axis 20 is smoothly performed.

However, in the conventional friction hinge device as described above, since the torsion spring is formed to be a closed circle shape, it requires much time and efforts to push the rotary axis 20 into the torsion spring 30.

Further, in the conventional friction hinge device, it is not that the whole sectional parts of the torsion spring 30 are contact with the rotary axis 20 but that only some parts of them are contact with the rotary axis 20. Since it is required a strong fastening elasticity of the spring when a predetermined torque is generated, an abnormal abrasion is generated due to the slackness and permanent transformation of the torsion spring 30 and the strong stress to the rotary axis 20, causing an unstable torque when it is used for a long time.

In addition, when the rotary spring 20 pushed into the torsion spring 30 is used for a long time, the force that holds the rotary axis 20 is deteriorated due to the abrasion of the torsion spring 30.

SUMMARY OF THE INVENTION

Accordingly, an object of the present invention is to provide a clip type friction hinge device which can be easily assembled, freely adjust the torque according to the number of the C type clips used in assembling, and improve the stability and reliability by preventing the transformation of the C type clips and minimizing the deviation between the static torque and the dynamic torque.

To achieve the above object, the clip type friction hinge device of the present invention comprises a housing; a rotary axis which is inserted to the housing to be rotatable; a torsion spring for elastically supporting the rotary axis for the housing; and a plurality of C type clips for adjusting a torque which are elastically inserted to the outer circumference of the torsion spring.

The housing has an axial hole to which the rotary axis is inserted and a fixing slot formed at the lower portion of the axial hole. The rotary axis has a first axis part to which the torsion spring is inserted, a second axis part connected to the end of the first axis part and a fixing part combined to the second axis part.

The torsion spring is comprised of a pair of semi-cylindrical spring members. By combining a pair of spring members together, there forms a central hole to which the rotary axis is pushed. And a projection part which is fitted to the fixing slot of the housing is formed at one side of the torsion spring. A pair of folding parts or embossing parts may be vertically folded at the projection part to face against each other. In addition, a positioning groove and a projection which face from each other and are used to easily fit the central position when combining a pair of spring members may be formed at the opposite side of the projection part.

Further, the C type clip has a slit opened in a radial direction and the section of the clip may have a square or circle shape.

According to the clip type friction hinge device of the present invention, the torsion spring and the C type clip may be easily assembled by the 2-division structure of the torsion spring and the slit of the C type clip. That is, the operations of assembling the rotary axis to the torsion spring and assembling the C type clips become convenient, thus remarkably reducing the time and efforts required in the assembling.

In addition, the contact area can be maximized by making the torsion spring be evenly contact with the rotary axis by the C type clips and an abnormal abrasion can be prevented by checking the transformation of the C type clips. Thereby, it is possible to improve the stability of the torque and enhance the reliability by minimizing the deviation between the static torque and the dynamic torque.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENT

The present invention will be described in detail with reference to the accompanying drawings FIGS. 3 to 7 show a clip type friction hinge device according to the present invention.

Figure 1:
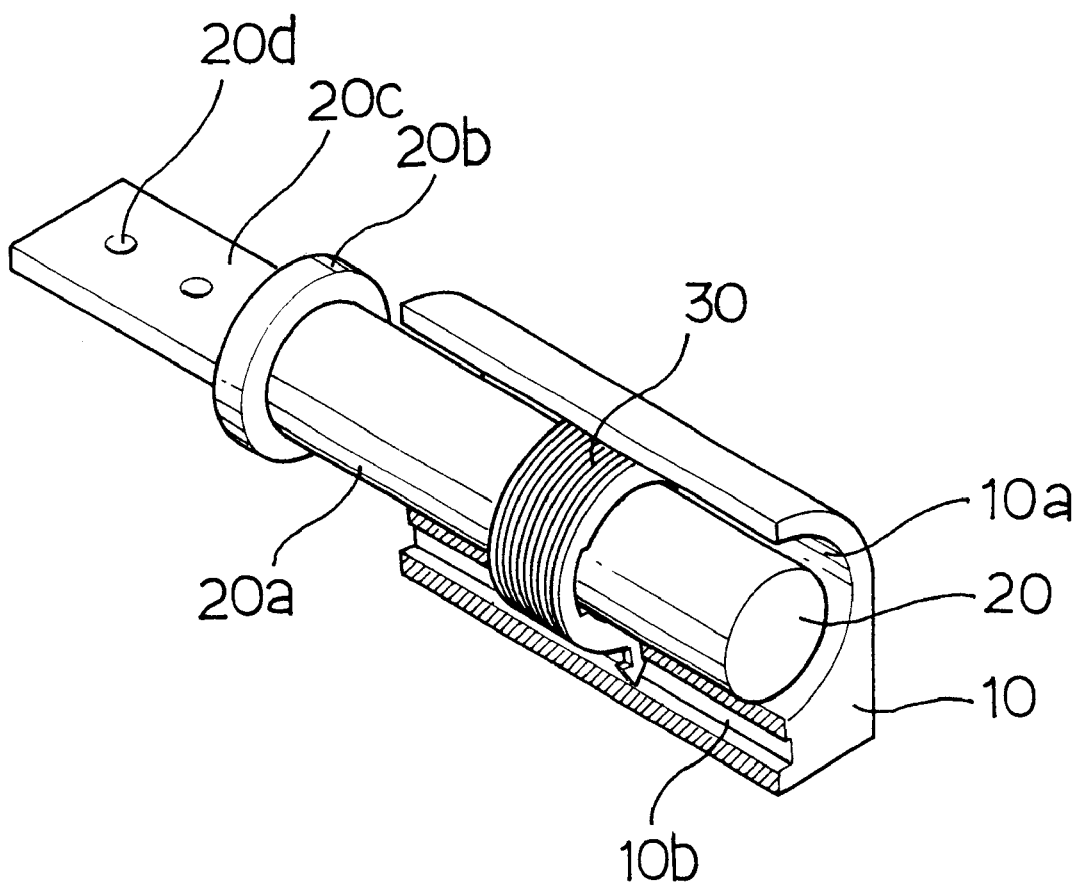
FIG. 1 is a partial perspective view showing a structure of a conventional friction hinge device.
Figure 2:
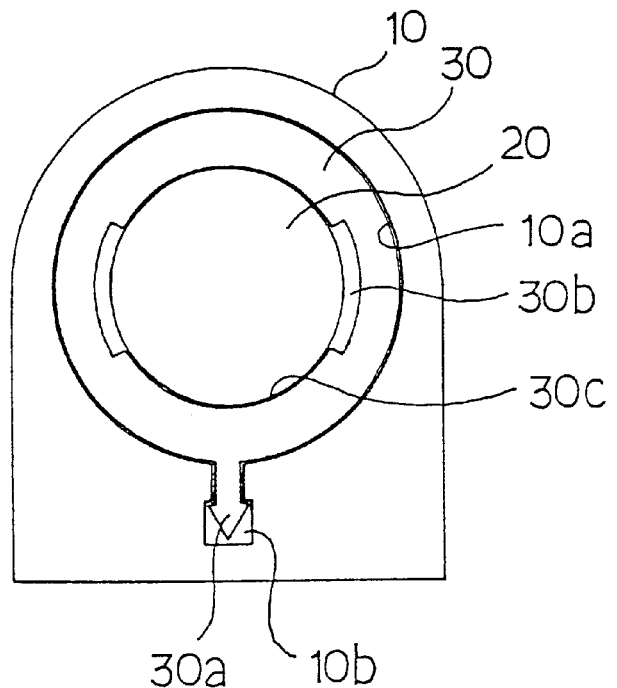
FIG. 2 is a front view showing the friction hinge device of FIG. 1.
Figure 3:
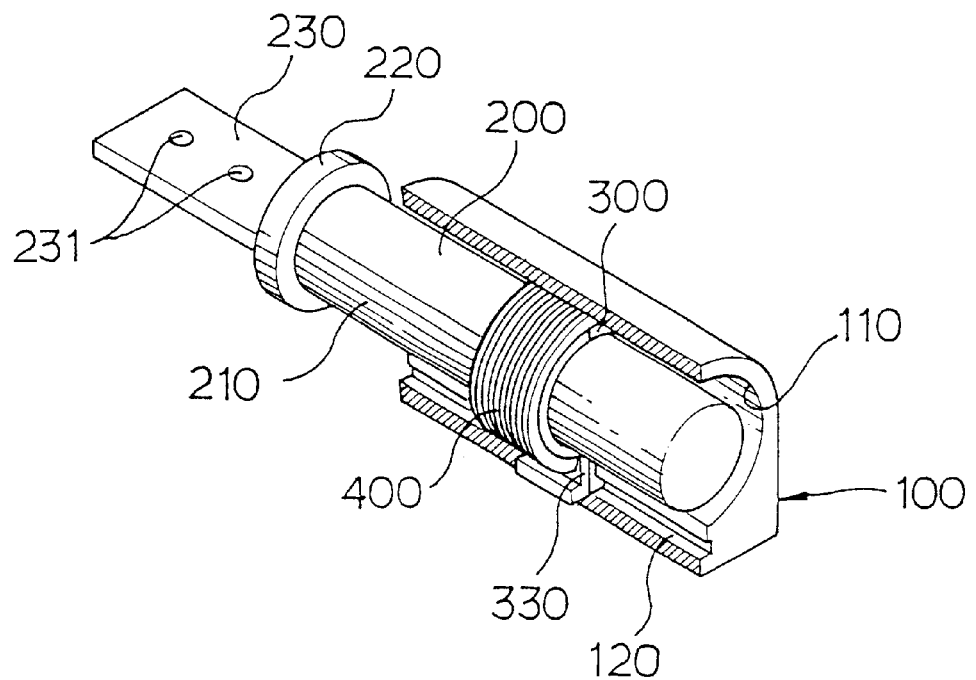
FIG. 3 is a partial perspective view showing a structure of a clip type friction hinge device according to a preferred embodiment of the present invention.
Figure 4:
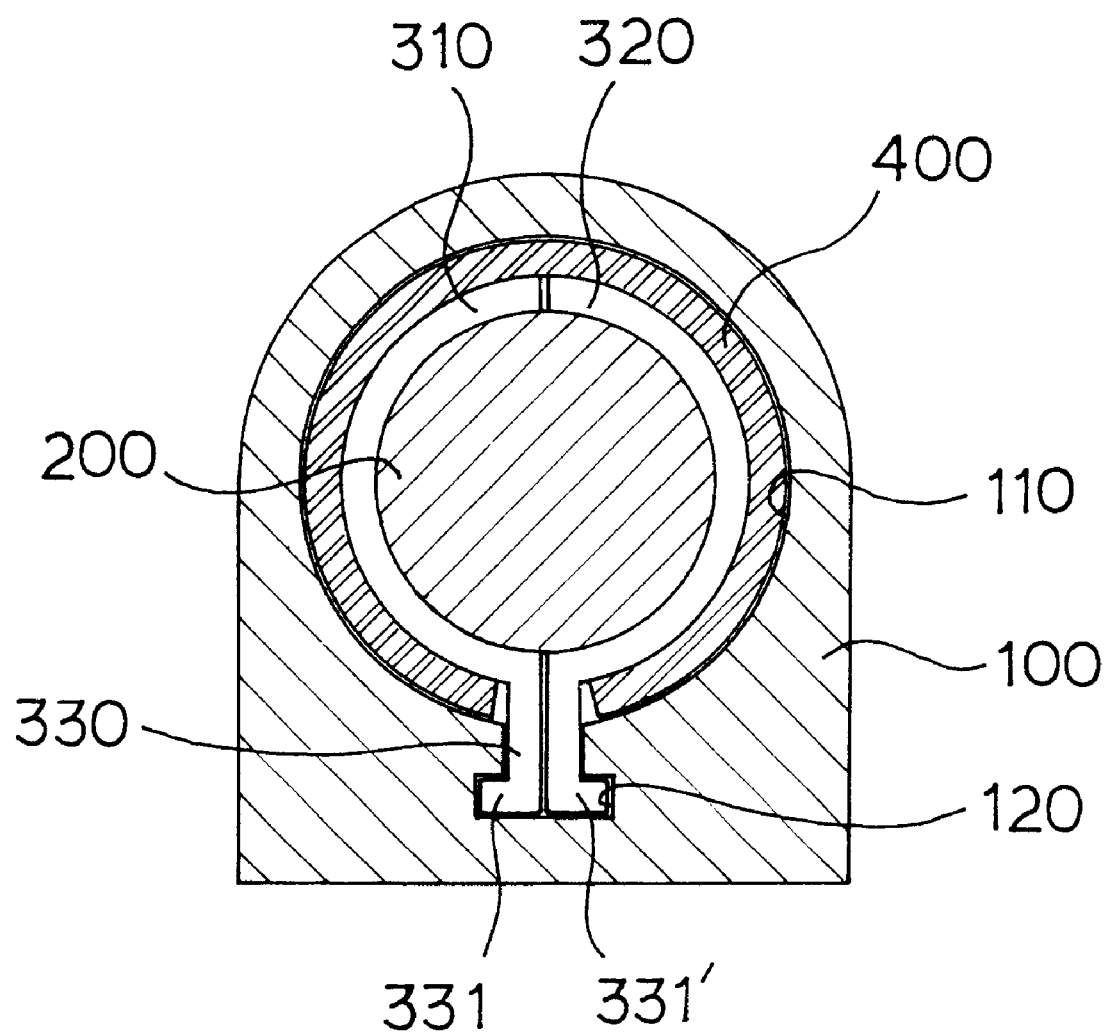
FIG. 4 is a front view showing the clip type friction hinge device of FIG. 3.
Figure 5:
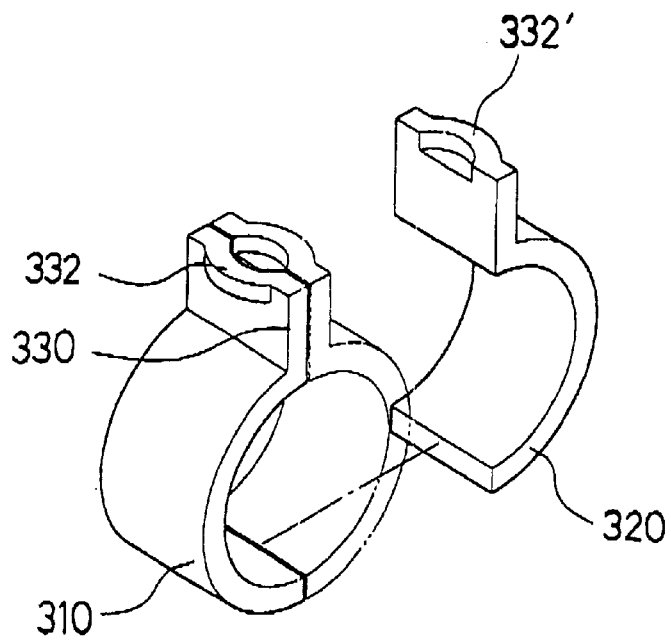
FIG. 5 is a perspective view showing an example of a torsion spring used in the clip type friction hinge device of the present invention.

As shown in FIGS. 3 and 4, the clip type friction hinge device of the present invention has a housing 100, a rotary axis 200 inserted to the housing to be rotatable, a torsion spring 300 for elastically supporting the rotary axis 200 for the housing 100, and a plurality of C type clips 400 which are elastically inserted to the outer circumference of the torsion spring 300.

The housing 100 has an axial hole 110 for holding the rotary axis 200 and a fixing slit 120 formed at the lower portion of the axial hole 110.

The rotary axis 200 has a first axis part 210 inserted to the axial hole 110 of the housing 100, a second axis part 220 combined to the end of the first axis part 210, and a fixing part 230 connected to the second axis part 220. The first and second axis parts 210 and 220 and the fing part 230 may be separately or unitedly formed according to the conditions in manufacturing and assembling. A hole for screw 231 is formed at the fixing part 230. The rotary axis 200 is combined to the cover of a notebook computer by a screw (not shown) fastened through the hole 231. In this case, the housing 100 is similarly combined to the main body of the notebook computer by the fastening of a screw.

Figure 6:
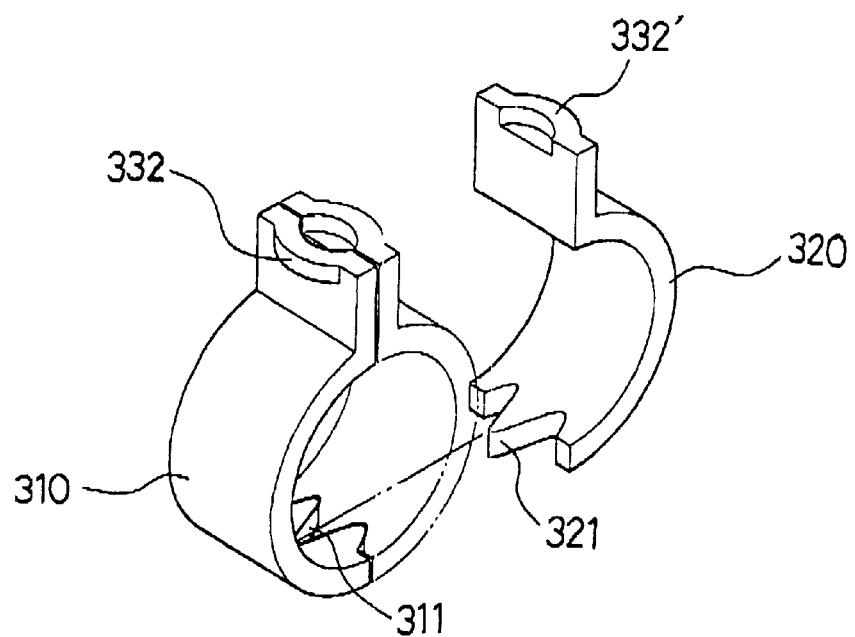
FIG. 6 is a perspective view showing another example of a torsion spring used in the clip type friction hinge device of the present invention.

The torsion spring 300 is inserted to the outer circumference of the first axis part 210 of the rotary axis 200 and then is inserted to the axial hole 110 of the housing 100 together with the rotary axis 200 not to be rotatable. The torsion spring 300 serves to make the rotary axis 200 rotate with receiving the torque due to the friction during the rotation of the rotary axis 200, by elastically supporting the rotary axis 200 for the housing 100. The torsion spring 300 has a plurality of semi-cylindrical spring members 310 and 320. By combining the spring members 310 and 320, there forms a central hole to which the rotary axis 200 is inserted. A projection part 330 which is fitted to the fixing slit 120 of the housing 100 is formed at one side of the torsion spring 300. If the projection part 330 is fitted to the fixing slit 120 of the housing 100, the torsion spring 300 is fixed to the axial hole 110 of the housing 100 not to be rotatable. A pair of folding parts 331 and 331' are vertically folded and formed at both sides of the projection part 330 to face against each other. The folding parts 331 and 331' are used to make the torsion spring 330 not be easily escaped from the axial hole 110 of the housing 100. Instead of the folding parts 331 and 331', embossing parts 332 and 332' which are projected to face against each other may be formed at both sides of the projection part 330. As shown in FIG. 6, at least more than one positioning groove 311 and a projection 321 which are used to correctly and easily fit the central position when the spring members 310 and 320 are combined are formed at the contact surfaces of a pair of semi-cylindrical spring members 310 and 320, more specifically, at the contact surfaces at the opposite side of the projection part 330 to correspond from each other.

Figure 7A:
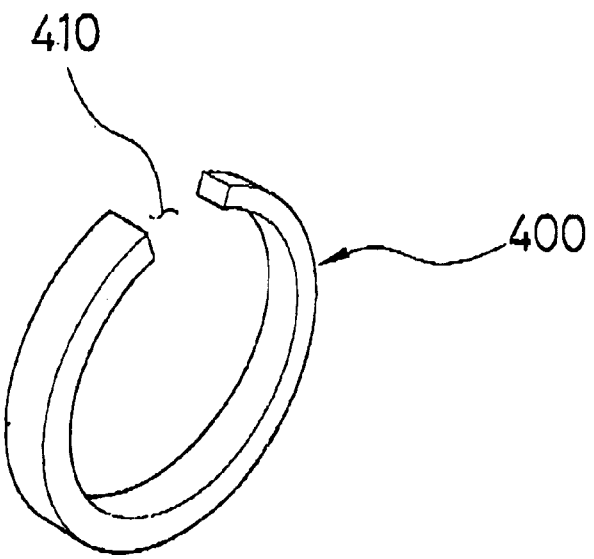
FIGS. 7A and 7B are perspective views showing various embodiments of the clip used in the clip type friction hinge device of the present invention.
Figure 7B:
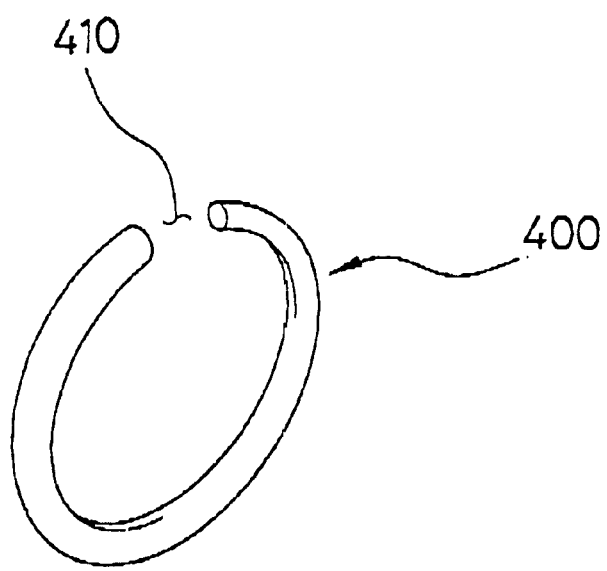

The C type clip 400 serves to make a pair of spring members 310 and 320 be combined by being elastically inserted to the outer circumference of the torsion spring 300 and to generate the torque due to the friction between the rotary axis 200 and the torsion spring 300. The number of the C type clips 400 may be varied according to the size and use of the friction hinge device. It is possible to easily adjust the torque by adding or reducing the number of the C type clips 400. The C type clip 400 has a slit 410 which is opened in a radial direction and thereby the central hole can be expanded, enabling a convenient assembling. In addition, the C type clip 400 may be formed to have a square or circle shape section, as shown in FIGS. 7A and 7B.

Meanwhile, even though not shown in the drawings, an oil groove in which the lubricating oil is charged may be formed at the internal circumference of the torsion spring 300. The oil functions to reduce the friction resistance between the outer circumference of the rotary axis 200 and the inner circumference of the central hole of the torsion spring 300 during the rotation of the rotary axis 200.

The C type clips may be constructed to have the same distance between the inner diameter and the outer diameter, but the deviation of the distance between the inner diameter and the outer diameter may be able to adjust the amount of transformation and elastic section of the spring.

The clip type friction hinge device as described above is assembled by fitting a pair of semi-cylindrical spring members 310 and 320 of the torsion spring 300 to the outer circumference of the first axial part 210 of the rotary axis 200 and then inserting a plurality of C type clips 400 to the outer circumference of the torsion spring 300. In this case, the central position of the pair of spring members 310 and 320 can be correctly and easily fitted by the positioning groove 311 and the projection 321 formed at the contact surfaces of the spring members 310 and 320, respectively. It is possible to adjust the torque by adding or reducing the number of the C type clips 400 according to the size and use of the friction hinge device. Thereafter, the rotary axis 200 to which the torsion spring 300 and a plurality of C type clips 400 are combined is finally inserted to the axial hole 110 of the housing 100.

Further, it is preferable that the C type clip 400 is assembled to have an inner diameter smaller than the outer diameter of the torsion spring 300 by at least more than 0.5 mm, to make the upper part of the C type clip have a little gap, In the clip type friction hinge device of the present invention applied to a notebook computer or a hinge part of a monitor, if a cover of the notebook is opened or the monitor is inclined to adjust the screen angle, the rotary axis 200 rotates with receiving the torque due to the friction with the torsion spring 300 and thereby restraining a rapid rotation and buffering the shock. If the rotation is stopped at a predetermined rotary angle, the rotary axis 200 is fixedly maintained at the angle by the pressure due to the fastening elasticity of the torsion spring 300 and C type clips 400. If the distance between the inner circumference and the outer circumference of the C type clips is varied, the torque strongly acts at a wider part. Thus, it is possible to adjust the strength of the torque at a desired rotation angle.

According to the clip type friction hinge device of the present invention as described above, since the torsion spring is divided into a pair of semi-cylindrical spring members, it is easy to assemble the torsion spring to the rotary axis. Also, the C type clip can be easily assembled to the torsion spring by expanding the central hole thereof by the slit which is formed at the C type clip and opened in a radial direction. Thereby, the time and efforts required in assembling the friction hinge device can be remarkably reduced.

In addition, the torque can be freely adjusted according to the number of the C type clips and the torsion spring is evenly contact to the rotary axis by the C type clips, thus preventing an abnormal abrasion. Hence, it is possible to improve the stability of the torque and enhance the reliability by minimizing the deviation between the static torque and the dynamic torque.

Although the present invention has been described in accordance with the embodiment shown in the figures, many modifications may be made by one of ordinary skill in the art without departing from the spirit and scope of the present invention, the scope of which is defined solely by the appended claims.

What is claimed is:

1. A clip type friction hinge device comprising:
   a housing having an axial hole and a fixing slit formed at a lower portion of said axial hole;
   a rotary axis which is inserted to said axial hole of said housing to be rotatable;
   a torsion spring which is inserted to said rotary axis to elastically support said rotary axis for said housing and then is fixedly inserted to said axial home of said housing together with said rotary axis, and is comprised of a pair of spring members, a projection part which is fitted to said fixing slit of said housing being formed at the end of each spring member; and
   a plurality of C type clips which are elastically inserted onto the outer circumference of said torsion spring.

2. The device as claimed in claim 1, wherein folding parts or embossing parts are formed at both sides of said projection part of said torsion spring to face against each other in a vertical direction for said projection part.

3. The device as claimed in claim 1, wherein at least more than one positioning groove and more than one projection which are used to fit a central position when combining said spring members are formed at the contact surfaces of said pair of semi-cylindrical spring members to correspond from each other.

4. The device as claimed in claim 1, wherein said C type clip has a square or circle shape section.

5. The device as claimed in claim 1, wherein the distances between the inner diameter and outer diameter of said C type clips are different from one another.

* * * * *